Nov. 8, 1960     D. E. WINKER     2,959,057

ACCELEROMETER

Filed Aug. 26, 1957

INVENTOR.
DANIEL E. WINKER
BY *Elliott & Pastoriza*
ATTORNEYS

United States Patent Office 2,959,057
Patented Nov. 8, 1960

2,959,057
ACCELEROMETER

Daniel E. Winker, Canoga Park, Calif., assignor to Physical Measurements Corporation, a corporation of Delaware Filed Aug. 26, 1957, Ser. No. 680,278

6 Claims. (Cl. 73—516)

This invention relates generally to accelerometers and more particularly to a linear accelerometer of the type incorporating dual masses for cancelling out angular accelerations.

The basic concept of coupling two rotatable members together each having a center of mass spaced from its center of rotation in order to measure accelerations along a single axis and cancel the effects of angular acceleration has been proposed heretofore. Some of these accelerometers have included a pair of masses secured to gear sectors having their teeth engaged so that the masses will move in unison and in opposite directions about spaced axes only under the influence of an acceleration or acceleration component normal to the plane of the axes. Accelerometers incorporating gearing of this type are subject to friction in the gear teeth themselves as well as a certain amount of backlash, all contributing towards error in the readings of the instrument. Further, in many instruments proposed heretofore, the weight of the masses introduces friction problems in the bearings rotatably mounting the masses.

Bearing the above in mind, it is a primary object of the present invention to provide an improved linear type of accelerometer incorporating the dual masses coupled together and mounted in such a manner as to substantially eliminate crosstalk and result in greater accuracy than has heretofore been possible.

More particularly, it is an object to provide an accelerometer of the above type incorporating a unique coupling system between the dual masses to eliminate cross talk and substantially eliminate any backlash as well as friction in the coupling portion itself.

Still another important object is to provide an accelerometer in which bearing friction in the mountings for the masses is minimized to a value below any heretofore attained.

These and other objects and advantages of this invention are accomplished by providing two substantially identical masses floated in a liquid contained within a sealed casing. The specific gravity of each of the masses is substantially equal to the specific gravity of the liquid itself so that the masses float therein. The two masses are respectively mounted within the casing for rotation about axes parallel to each other. Because of the effective "weightlessness" of the masses when floated in the liquid, the bearing pressure on the bearings in the rotational mountings is minimized and substantially friction free bearings may be employed. The masses themselves are geometrically substantially identical and are designed such that their centers of flotation are displaced from their respective centers of mass. As a consequence, linear acceleration of the casing will cause a rotational displacement of the masses about their respective axes.

In accordance with an important feature of the invention, each of the masses is coupled to the other by means of flexible non-extensible means in the form of tapes connected diagonally to opposing portions of the masses so that the masses can only rotate in opposite directions in unison. The provision of the tapes not only provides a system in which friction in the coupling of the masses is substantially eliminated but also one in which there is substantially no backlash. By coupling the masses in this manner, any accelerations due to angular movement of the casing will tend to cause the respective masses to rotate in like directions about their individual axes which rotational direction is prevented by the intercoupling between the masses. Thus, these angular accelerations are essentially canceled out.

A better understanding of one embodiment of the invention will be had by referring to the accompanying drawings, in which.

Figure 1:
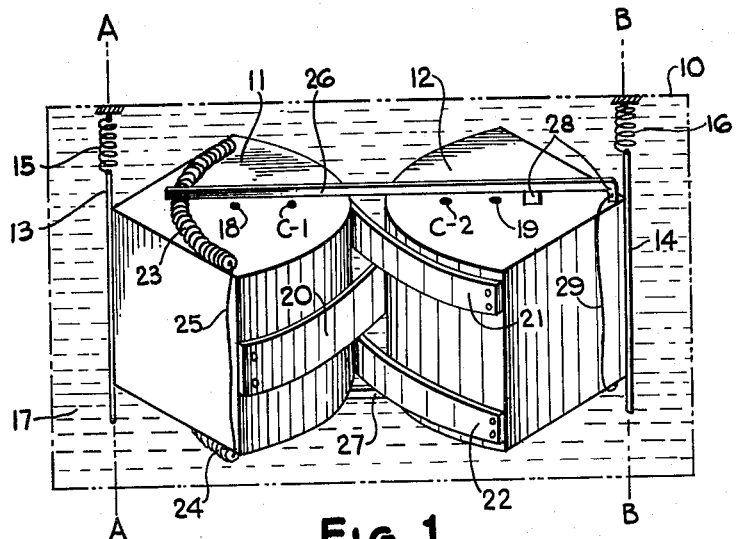
Figure 1 is a schematic perspective view of the essential elements making up the accelerometer of this invention.

Referring first to Figure 1, there is illustrated schematically by the dashed outline a casing 10 incorporating two substantially identical masses 11 and 12 mounted for rotation to the casing as by shafts 13 and 14, respectively. The axes of these shafts about which the respective masses rotate are designated A—A and B—B and extend parallel to each other. The shafts themselves in a preferred embodiment rotate in jewel bearings at their upper and lower ends at the points where they intersect the ceiling and floor of the casing; however, other structures for rotatably mounting the shafts may be employed. The various types of mounting means are well known to those skilled in the art and it is not thought necessary to describe them in detail.

As shown in Figure 1, the shafts 13 and 14 are biased to a neutral rotational position by means of spiral springs 15 and 16 connected between the shafts and the casing. Other biasing means such as torsion strips which simultaneously serve as mounting shafts could be used. Further, an electrical biasing means such as an electrical torquer having an output proportional to displacement could be used. Again, such biasing means are well known in the art and are here set forth only schematically so as to avoid obscuring other features in the drawings. The function of the springs or such biasing means as are employed, is to oppose rotational motion of the masses as a consequence of acceleration of the casing as will become clearer as the description proceeds.

The casing 10 of Figure 1 is filled with a liquid indicated at 17. The average specific gravity of the masses 11 and 12 is made equal to the specific gravity of the liquid 17 so that the two masses essentially float in the liquid. The geometry of the masses is such that the centers of flotation of each of the masses 11 and 12, schematically indicated as lying on vertical lines which would extend through the top of the masses at the points 18 and 19 respectively, are displaced from the centers of mass, indicated in Figure 1 as lying on vertical lines which would extend through the top of the masses at the points C-1 and C-2 respectively. Because of the displacement of the centers of flotation with respect to the centers of mass, any acceleration of the entire casing 10 will result in an inertial reaction tending to rotate the masses about their respective axes A—A and B—B.

In accordance with an important feature of the invention, the masses 11 and 12 are coupled together by flexible non-extensible tapes illustrated at 20, 21, and 22. As shown, these tapes are connected to diagonally opposite portions of opposing faces of the two masses 11 and 12 and serve to couple the masses together such that they can only rotate in opposite directions in unison. For example, clockwise rotation of the right hand sensing mass 12 about the axis B—B as viewed from above will result in a tension in the tape 20 pulling the left hand sensing mass 11 in a counter-clockwise direction about the axis A—A as viewed from above. Similarly, counter-clockwise rotation of the mass 12 will, through the tapes 21, cause this latter mass to rotate in a clockwise direction. By making the tapes of a plastic material approximately 1.5 mils in thickness and by securing the same under tension, there is substantially no friction or backlash in the coupling arrangement.

In order to provide an indication of the degree of movement of the masses when the casing is under an accelerated condition, there may be provided an electrical indicating system preferably including upper and lower resistance coils 23 and 24 respectively secured across the top and bottom of the mass 11 and connected in parallel as by a connecting lead 25. A pair of wiping arms 26 and 27 are in turn respectively secured to the top and bottom of the mass 12 as at 28 for the arm 26 and are arranged to extend respectively above and below the mass 11 to engage the respective resistances 23 and 24. These wiping arms are connected together by a connecting lead 29.

Figure 2:
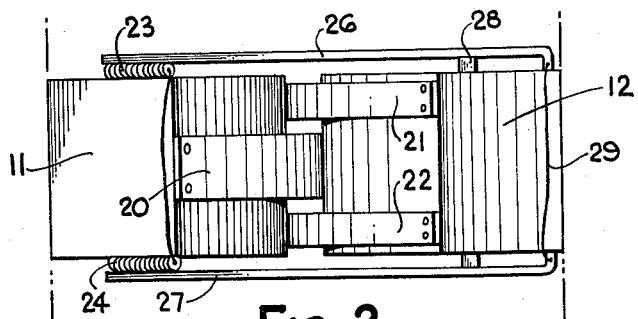
Figure 2 is a side elevational view of the accelerometer of Figure 1.

This arrangement of the potentiometer arms may best be seen in Figure 2. The reason for providing two arms is so that the engagement pressure with the resistances acting on the ends of the potentiometer arms are directed upwardly and downwardly respectively and made substantially equal. This equalization of the pressures avoids the possibility of any torque being applied on the bearings for the rotational mountings tending to move the rotational axes out of parallelism and yet enables the necessary contact pressure to be exerted on the resistances.

Figure 3:
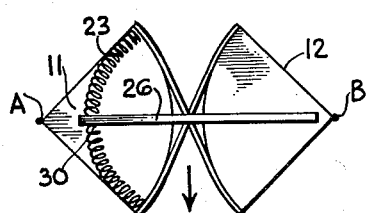
Figure 3 is a schematic plan view of the sensing masses of the accelerometer in a neutral position.
Figure 4:
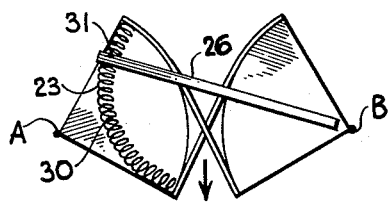
Figure 4 is a view similar to Figure 3 but illustrating the position of the masses under acceleration; and, Figure 5 is a simplified schematic circuit diagram of one type of electrical indicating means associated with the accelerometer of Figures 1 through 4.

Referring now to Figure 3, under conditions of no acceleration, the resilient biasing springs 15 and 16 of Figure 1 are designed to hold the masses in a neutral position wherein the potentiometer arm such as the arm 26 makes contact at a point 30, substantially midway on the resistance 23. In Figure 4, the position of the masses is illustrated when the instrument is subjected to a linear acceleration in the direction of the arrow. As a consequence of this acceleration, the masses rotate in opposite directions, and the arm 26 is moved along the resistance to a new point 31. The change in the contact position of the wiper arm 26 from 30 to the point 31 may be indicated by a suitable electrical measuring circuit such as schematically illustrated in Figure 5.

Figure 5:
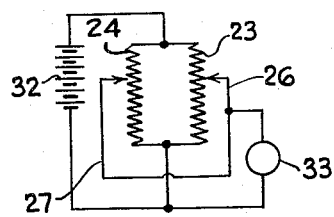

Referring to Figure 5, the resistances 23 and 24 are schematically illustrated as connected in parallel across a source of electrical energy such as a battery 32. The wiper arms 26 and 27 are also indicated as engaging these resistances, respectively, at corresponding points and as also connected together. A meter such as a volt meter 33 is connected between the two wiper arms 26 and 27 and the lower terminal of the battery 32. It will be evident from the foregoing that a change in the tap position of the wiper arms 26 and 27 on the resistances 23 and 24 will result in a change in reading in the volt meter 33 which may be calibrated to read acceleration directly. Other types of known indicating circuits may, of course, be employed.

From the foregoing description, the overall operation of the improved linear accelerometer of this invention will be evident. Whenever the casing 10 is accelerated in a direction normal to the plane including the axes A—A and B—B such as indicated by the arrows in Figures 3 and 4, the natural inertia of the masses will result in torque tending to rotate the masses about their rotational axes. This torque is established as a result of the fact that the masses have centers of flotation which are displaced from their centers of mass. If the centers of mass corresponded with the centers of flotation, the masses would not move regardless of the manner in which the casing 10 were accelerated since the specific gravity of the masses equals that of the liquid within the container. The resulting rotation of the masses is opposed by the springs 15 and 16 until these springs exert a counter-torque on the shafts 13 and 14 equal to the torque established as a result of the acceleration. The masses will thus assume a new position under the action of the acceleration such as shown in Figure 4 giving rise to a change in reading on the volt meter 33. If the original reading on the meter is calibrated to indicate zero acceleration, then the new reading, as a result of movement of the wiper arms may be calibrated to indicate both the direction and magnitude of the acceleration.

The coupling of the masses together for rotation in opposite directions in unison eliminates the effects of any angular accelerations on the masses.

The present invention accordingly enables accurate detection and measurement of linear accelerations to be made. As a consequence of the flotation principle, as mentioned heretofore, minimum pressure is exerted at the bearings for the rotational mountings since the masses, insofar as the bearings are concerned, appear to be essentially weightless. Thus, it is possible to employ extremely fine jewel bearings for rotatably mounting the masses. The further feature of employing dual wiper arms on opposite sides of the masses for engaging dual resistances connected in parallel cancels the contact pressures and prevents reaction torques from being exerted on the bearings for the rotational mountings as a consequence of such pressures. Finally, the provision of flexible inextensible tapes coupling the opposing surfaces of the masses together as shown, minimizes friction and also any backlash whereby the masses are constrained to move only in opposite directions and in unison. These tapes may, of course, comprise materials other than plastic. Preferably, the opposing faces of the masses are convexly cylindrically curved as shown, the center of curvatures coinciding with the axes A—A and B—B, respectively.

Modifications within the scope and spirit of the present invention will occur to those skilled in the art. For example, while two biasing springs 15 and 16 have been illustrated, only one such spring could be employed since the masses must rotate in unison. Further, while a specific detecting means has been described, inductive or capacitive means may be employed for providing a signal responsive to the position of the masses. In this latter event, no physical contact between a wiper arm and resistance coils, for example, is necessary. If an electrical torquer is used for biasing the masses to their neutral position, this same torquer may be employed to provide, simultaneously, an output signal responsive to the position of the masses. The accelerometer is, therefore, not to be thought of as limited in the specific embodiment set forth for illustrative purposes.

What is claimed is:

1. An accelerometer comprising, in combination: a casing; a liquid in said casing; two substantially identical masses floated in said liquid; rotational mountings connected to said masses, respectively, to mount said masses to said casing for rotation about axes parallel to each other, the center of masses of said masses being respectively displaced from the centers of flotation thereof; and at least three flexible non-extensible tape portions, two of said tape portions being connected to diagonally opposing upper and lower portions on said masses, and a third tape portion being connected to opposite diagonally opposing central portions on said masses to cross between said two of said tape portions and couple said masses together for opposite rotation about said axes in unison.

2. An accelerometer according to claim 1, in which said opposing portions comprise convex surface portions.

3. An accelerometer according to claim 2, including biasing means connected between at least one of said masses and said casing biasing said masses to a neutral position with respect to each other and opposing rotation of said masses from said position when said casing is accelerated in a direction normal to the plane including said axes.

4. An accelerometer according to claim 3, including responsive means in said casing for providing an indication of the position of said masses.

5. An accelerometer according to claim 4, in which said responsive means includes electrical resistance means carried by one of said masses and an electrical conducting wiping arm carried by the other of said masses positioned to engage said electrical resistance means in different positions upon rotation of said masses from said neutral position; and means for detecting changes in the position of said wiper arm on said electrical resistance.

6. An accelerometer according to claim 5, in which said convex surface portions are portions of cylindrical surfaces having centers of curvatures, respectively, coinciding with said axes, and said electrical resistance means comprise upper and lower resistances connected in parallel and secured, respectively, to the top and bottom surfaces of said one of said masses; said electrical conducting arm being secured to the top surface of the other of said masses to engage said upper resistance; and a second conducting arm secured to the bottom of said other of said masses to engage said lower resistance and electrically connected to said first mentioned arm.

References Cited in the file of this patent

UNITED STATES PATENTS

| | | |
|---|---|---|
| 2,706,401 | Spaulding | Apr. 19, 1955 |
| 2,797,911 | Montgomery | July 2, 1957 |
| 2,801,097 | Adamson | July 30, 1957 |
| 2,802,956 | Jarosh et al. | Aug. 13, 1957 |

FOREIGN PATENTS

| | | |
|---|---|---|
| 1,060,073 | France | Nov. 18, 1953 |